No. 661,022. Patented Oct. 30, 1900.
H. E. RINGLE.
BICYCLE BRAKE.
(Application filed Mar. 12, 1900.)
(No Model.)
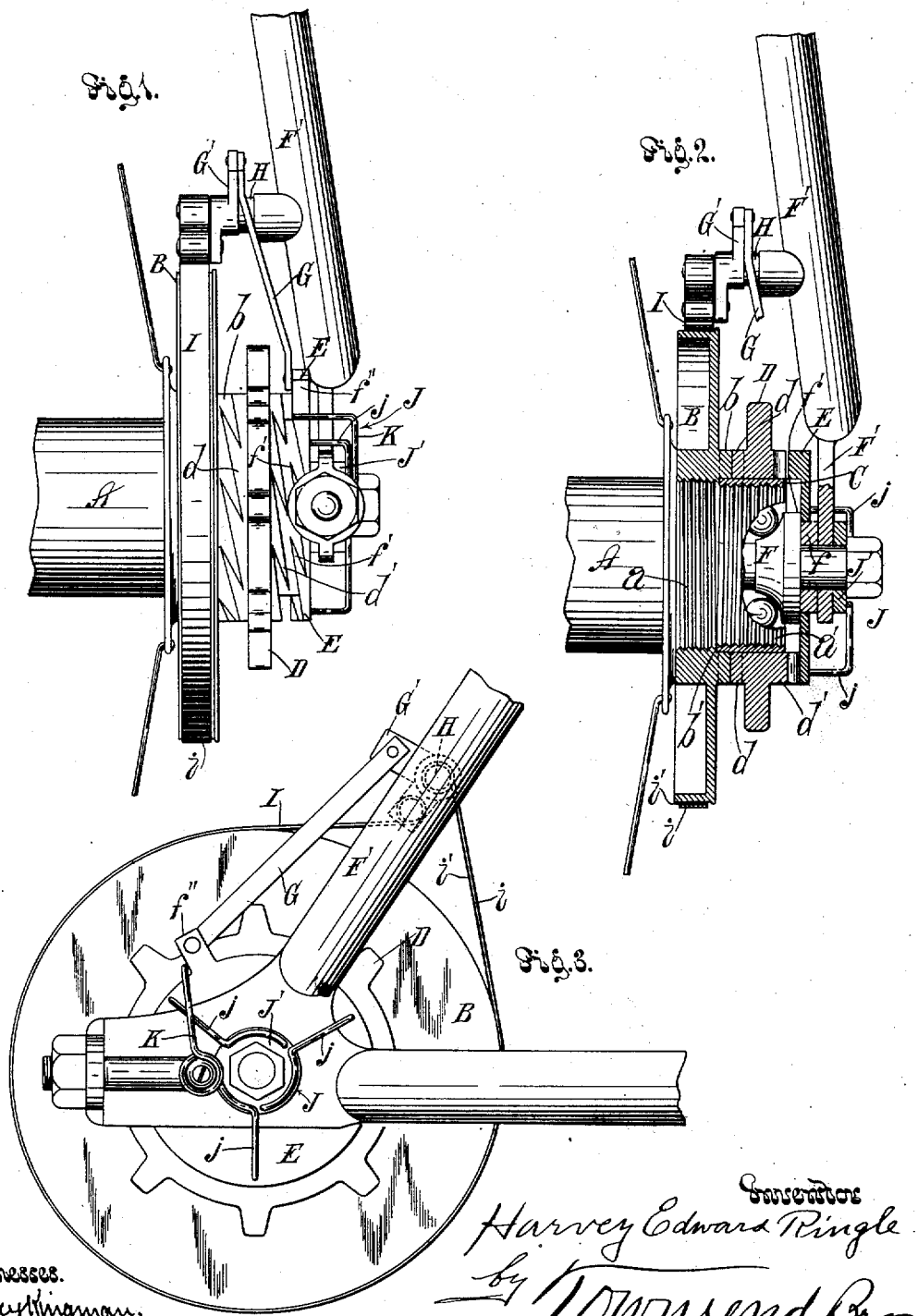

UNITED STATES PATENT OFFICE.

HARVEY E. RINGLE, OF REDLANDS, CALIFORNIA.

BICYCLE-BRAKE.

SPECIFICATION forming part of Letters Patent No. 661,022, dated October 30, 1900.

Application filed March 12, 1900. Serial No. 8,424. (No model.)

*To all whom it may concern:*

Be it known that I, HARVEY EDWARD RINGLE, a citizen of the United States, residing at Redlands, in the county of San Bernardino and State of California, have invented new and useful Improvements in Bicycle-Brakes, of which the following is a specification.

The particular object of my invention is to provide means whereby a bicycler may hold his pedals stationary at any time desired and may freely coast with the feet resting upon and supported by the pedals and to so arrange the parts that by a slight back-pedaling motion a brake will be applied which will quickly bring the bicycle to a standstill, the operation being perfectly under the control of the rider and instinctively regulated by the rider—that is to say, if the brake is too suddenly applied the natural impulse is to propel the wheel forward, and by the forward movement of the pedals the brake is released.

My brake can be applied to the hind wheel of any ordinary bicycle and the brake will not engage with the tire.

My bicycle-brake comprises a hub, a brake-wheel fixed to the hub and provided on its face with teeth sloping in one direction, a brake for braking the brake-wheel, mechanism for operating the brake, a non-sliding brake-operating disk or member mounted loosely coaxial of the hub for operating said mechanism and provided with teeth sloping in the direction opposite to those of the brake-wheel, a sprocket-wheel mounted loosely coaxial of the hub to slide to and fro between the brake-wheel and the brake-operating mechanism and provided on the face presented toward the brake-wheel with teeth sloping in the direction opposite to those on the outside of the brake-wheel and provided on the face presented toward the brake-operating member with teeth sloping in the direction opposite to the teeth of such member, the space between the outer sides of the toothed faces of the sprocket-wheel being greater than the space between the toothed face of the brake-wheel and the toothed face of the brake-operating member and less than such space plus the depth of the notches of one of the toothed faces, whereby when the sprocket-wheel is rotated forward its teeth on the one side will by contact with the brake-operating member be forced out of the notches in the brake-operating disk, which will be held stationary by means of its connection with the brake mechanism, and its teeth on the other side will catch into the toothed face of the brake-wheel, thus to rotate the bicycle-wheel, and when the sprocket-wheel is held stationary while the bicycle-hub is rotating forward the teeth of the sprocket-wheel will by contact with the teeth of the brake-wheel be forced out of the notches in the toothed face of the brake-wheel and will be forced into engagement with the teeth of the brake-operating disk to rotate such disk and cause it to operate the brake mechanism to apply the brake to the brake-wheel.

My invention comprises the various features of construction and combinations of parts hereinafter fully set forth and claimed whereby I accomplish the objects hereinbefore set forth.

The accompanying drawings illustrate my invention.

Figure 1 is a fragmental rear elevation of a bicycle provided with my invention. Fig. 2 is a view of the same, partly in section, to expose the construction. Fig. 3 is a fragmental side elevation.

In the drawings, A represents a driven member—viz., the hub of the bicycle—which is provided with the ordinary right-handed screw $a$ for the driving member—viz., the sprocket-wheel—and the left-handed screw $a'$ for the lock-nut.

In applying my device to bicycles the sprocket-wheel is first removed and a clutch member—viz., band or brake wheel B—is screwed upon the wheel in place of the sprocket-wheel. This clutch-member band-wheel is provided with a hub having upon its outer face a series of ratchet-teeth $b$, and a sleeve C, provided with left-hand screw-threads, is screwed upon the hub of the bicycle and seats in an annular groove $b'$, provided in the toothed hub of the wheel B. This sleeve serves as the lock-nut to lock the brake-wheel in position and to prevent it from unscrewing from its seat. Journaled and slidingly mounted upon this sleeve is a sprocket-wheel D, which is provided upon its inner face with series of ratchet-teeth $d$, which are adapted to take into the ratchet-teeth $b$ when the pedals are rotated to drive the bicycle forward. Upon the outer face of this sprocket-wheel are arranged ratchet-teeth $d'$, which are reverse from the ratchet-teeth $d$.

E is a laterally-moving brake-operating member, the same being a wheel or disk which is in the form of a cup adapted to fit over the end of the hub and provided with a central opening to slide over the washer $f$, which is placed between the cone F and the side member $F'$ of the forks, so as to give sufficient room to allow the brake-operating disk or wheel to play in and out when necessary, as will hereinafter be fully set forth. This brake-disk is provided upon its inner face with series of ratchet-teeth $f'$, which are adapted to be engaged by the ratchet-teeth $d'$ when the pedals are rotated backward. Secured to this disk is a brake-operating arm $f''$, to which is pivoted a connecting-arm G, the other end of which is pivoted to a bell-crank lever $G'$, which is pivoted upon a pin H, which is rigidly fixed to the member $F'$ of the hind fork. To the other end of the bell-crank lever is secured one end of a brake-band I, the other end of which is attached to the pin H. This band encircles the band-wheel B and forms in combination therewith the ordinary band-brake. The band consists of a steel strap $i$, lined with leather $i'$, to give greater friction and to prevent heating.

J is a spring which is secured to the adjusting-washer $J'$ and is provided with three forks or fingers $j$, which engage with the brake-disk and serve to operate to normally force it inward, as shown in Fig. 2.

Sufficient space is left between the brake-disk E and the band-wheel B to allow the sprocket-wheel D to reciprocate back and forth from one to the other—that is to say, as shown in Fig. 1, if the sprocket-wheel is rotated to drive the wheel forward the teeth $d'$, riding upon the teeth $f'$, thereby force the sprocket-wheel D toward the band-wheel B, the teeth $d$ entering into engagement with the ratchet-teeth $b$. These teeth are all undercut or hooked or project forward, so that when the points come into engagement the inclined faces of the teeth carry the sprocket-wheel snugly against the band-wheel, with the teeth closely interlocking. When the revolution of the pedals is stopped, the power applied through the ratchet-teeth $b$, acting against the ratchet-teeth $d$, forces the sprocket-wheel outward and carries the teeth $d'$ into position to engage with the ratchet-teeth $f'$. If the points of the teeth $d'$ and the teeth $f'$ come opposite each other at this juncture, the brake-disk is forced outward thereby, the spring J yielding for this purpose and afterward forcing the disk back into its normal position.

K is a spring which normally holds the brake-arm $f'''$ upward to free the band I from its engagement with the brake-wheel B.

What I claim, and desire to secure by Letters Patent of the United States, is—

1. In a bicycle-brake, the combination set forth of the band-wheel screwed upon the hub of the hind wheel and provided upon its outer face with ratchet-teeth; the sleeve screwed upon said hub and arranged to lock the band-wheel in position; a sprocket-wheel provided upon its inner face with ratchet-teeth to take into the ratchet-teeth of the band-wheel when the pedals are operated to drive the bicycle forward, and provided upon its outer face with reverse ratchet-teeth; the brake-operating member loosely mounted coaxially of the sleeve and provided with teeth to be engaged by the reverse teeth upon the ratchet-wheel when the pedals are operated to drive the sprocket-wheel backward; the band encircling the brake-wheel; the lever adapted to operate the band; and a connecting-arm between the lever and the brake-operating member.

2. In a bicycle-brake, the combination of a hub; a brake-wheel fixed to the hub and provided at its face with teeth sloping in one direction; a brake for braking the brake-wheel; mechanism for operating the brake; a member loosely mounted coaxial of the hub for operating said mechanism and provided with teeth sloping in the direction opposite to those of the brake-wheel; a sprocket-wheel mounted loosely coaxial of the hub to slide to and fro between the brake-wheel and the brake-operating member and provided on the face presented toward the brake-wheel, with teeth sloping in the direction opposite to the teeth of the brake-wheel and provided on the face presented toward the brake-operating member with teeth sloping in the direction opposite to the teeth of the brake-operating member; the space between the outer sides of the toothed faces of the sprocket-wheel being greater than the space between the toothed face of the brake-wheel and the toothed face of the brake-operating member, and less than such space plus the depth of the notches of one of the toothed faces.

3. In a bicycle-brake, the combination set forth of the hub; a brake-wheel screwed upon the hub; a smooth sleeve screwed upon the hub to lock the brake-wheel in position; a sprocket-wheel having ratchet-teeth on both sides and mounted upon the sleeve; a washer mounted upon the axle; a brake-operating disk independent of the hub and having ratchet-teeth to engage with the teeth on the sprocket-wheel which fits loosely between the brake-disk and the brake-wheel and is adapted to engage with the brake-wheel when rotated in one direction to drive the bicycle, and to be released therefrom to allow the hub to rotate freely when the sprocket-wheel is rotated backward or held from rotating, and to engage with the brake-disk when the sprocket-wheel is rotated backward; and a brake for the brake-wheel adapted to be operated by the brake-disk.

4. In a bicycle-brake, the combination set forth of the brake-wheel secured upon the hub and provided on its outer face with the ratchet-teeth; the sleeve screwed upon the hub and locking the brake-wheel in position; the sprocket-wheel mounted upon the sleeve and provided on its inner face with teeth adapted to take into the teeth on the brake-wheel when the sprocket-wheel is rotated forward and provided on the other side with reverse ratchet-teeth; a brake-disk mounted coaxially of the hub and provided upon its inner face with ratchet-teeth to be engaged by the teeth upon the outer face of the sprocket-wheel when the sprocket-wheel is rotated backward, sufficient space being allowed between the brake-wheel and the brake-disk to allow the sprocket-wheel to rotate forward without engaging the brake-disk when in engagement with the brake-wheel, and to allow the brake-wheel to rotate freely without engaging the sprocket-wheel when the sprocket-wheel is in engagement with the brake-disk; and a brake adapted to be operated by the brake-disk.

5. A bicycle-brake comprising a sprocket-wheel provided upon opposite sides with reversely-directed ratchet-teeth and loosely mounted upon the bicycle-hub; a clutch-wheel secured to the hub and provided with ratchet-teeth; a brake-disk with teeth to engage the ratchet-teeth of the sprocket-wheel; means for operatively connecting the sprocket-wheel with the brake-wheel or the brake-disk; and a brake adapted to be operated by the brake-disk.

6. A bicycle-brake comprising a brake-wheel provided with ratchet-teeth and fixed upon a hub; a brake-disk provided with ratchet-teeth and independent of the hub; a sprocket-wheel arranged between the brake-wheel and the brake-disk and adapted to be shifted and thrown into engagement with either the brake-disk or the brake-wheel; and a brake adapted to be operated by the brake-disk to engage the brake-wheel.

7. In a bicycle-brake, the combination of the brake-wheel fixed upon the hub and provided with ratchet-teeth; the brake-disk independent of the hub and provided with ratchet-teeth; the sprocket-wheel journaled upon the hub and provided upon opposite sides with ratchet-teeth adapted to engage with either the brake-wheel or the brake-disk; a brake adapted to be operated by the brake-disk; and a spring yieldingly forcing the brake-disk toward the brake-wheel.

8. In a bicycle-brake, the combination of the brake-wheel screwed upon the bicycle-hub and provided upon its outer face with ratchet-teeth; the brake-disk journaled upon the hub and provided upon its inner face with ratchet-teeth; the sprocket-wheel journaled upon the hub and provided upon opposite sides with ratchet-teeth to engage with the teeth upon the brake-wheel, and the teeth upon the brake-disk; the arm secured to the brake-disk; the journal-pin fixed upon the hind fork of the bicycle; the bell-crank lever journaled upon the pin; the friction-band having one end secured to the pin and its other end secured to one end of the bell-crank lever; and an arm connecting the other end of the bell-crank lever with the brake-disk arm.

9. The combination with a driving member, and a driven member, of a clutch member fixed against rotation upon the driven member, a laterally-movable brake member located upon the opposite side of the driving member, the latter being laterally movable for engagement with each of the other members.

In testimony whereof I have signed my name to this specification, in the presence of two subscribing witnesses, at Redlands, California, this 16th day of February, 1900.

HARVEY E. RINGLE.

Witnesses:
FRANK FIANKE,
WALTER A. COVINGTON.